United States Patent
Fukazawa et al.

(10) Patent No.: US 11,404,720 B2
(45) Date of Patent: Aug. 2, 2022

(54) METHOD FOR PRODUCING LITHIUM TITANIUM PHOSPHATE

(71) Applicant: NIPPON CHEMICAL INDUSTRIAL CO., LTD., Tokyo (JP)

(72) Inventors: Junya Fukazawa, Tokyo (JP); Toru Hata, Tokyo (JP); Takuma Kato, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/415,127

(22) PCT Filed: Jan. 27, 2020

(86) PCT No.: PCT/JP2020/002782
§ 371 (c)(1),
(2) Date: Jun. 17, 2021

(87) PCT Pub. No.: WO2020/158666
PCT Pub. Date: Aug. 6, 2020

(65) Prior Publication Data
US 2022/0045356 A1    Feb. 10, 2022

(30) Foreign Application Priority Data

Jan. 29, 2019  (JP) .............................. JP2019-012871
Jul. 2, 2019   (JP) .............................. JP2019-123388

(51) Int. Cl.
*H01M 10/0562* (2010.01)
*C01B 25/45* (2006.01)
*B01J 2/06* (2006.01)

(52) U.S. Cl.
CPC ......... *H01M 10/0562* (2013.01); *C01B 25/45* (2013.01); *B01J 2/06* (2013.01);
(Continued)

(58) Field of Classification Search
None
See application file for complete search history.

(56) References Cited

U.S. PATENT DOCUMENTS 7,060,206 B2 * 6/2006 Barker ................ H01M 4/1391
252/518.1
2012/0295168 A1 * 11/2012 Holzapfel ............... C01B 25/37
429/319
(Continued)

FOREIGN PATENT DOCUMENTS

JP    2-162605 A   6/1990
JP    5-139781 A   6/1993
(Continued)

OTHER PUBLICATIONS

Dashjav et al., "The influence of water on the electrical conductivity of aluminum-substituted lithium titanium phosphates", Aug. 2018, Solid State Ionics, 32, 83-90 (Year: 2018).*
(Continued)

*Primary Examiner* — Daniel S Gatewood
(74) *Attorney, Agent, or Firm* — WHDA, LLP

(57) ABSTRACT

An X-ray diffractometrically single-phase lithium titanium phosphate can be obtained by an industrially advantageous method. Provided is a method for producing the lithium titanium phosphate having a NASICON structure represented by the following general formula (1): $Li_{1+x}M_x(Ti_{1-y}A_y)_{2-x}(PO_4)_3$ (1), and provided is a method comprising a first step of preparing a raw material mixed slurry (1) comprising, at least, titanium dioxide, phosphoric acid and a surfactant, a second step of heat treating the raw material mixed slurry (1) to obtain a raw material heat-treated slurry (2), a third step of mixing the raw material heat-treated slurry (2) with a lithium source to obtain a lithium-containing raw material heat-treated slurry (3), a fourth step of subjecting the lithium-containing raw material heat-treated
(Continued)

slurry (3) to a spray drying treatment to obtain a reaction precursor containing, at least, Ti, P and Li, and a fifth step of firing the reaction precursor.

9 Claims, 4 Drawing Sheets

(52) U.S. Cl.
CPC ...... *C01P 2002/50* (2013.01); *C01P 2002/72* (2013.01); *C01P 2002/82* (2013.01); *C01P 2004/03* (2013.01); *C01P 2006/40* (2013.01); *H01M 2300/0068* (2013.01)

(56) References Cited

U.S. PATENT DOCUMENTS

| | | |
|---|---|---|
| 2014/0162136 A1 | 6/2014 | Kang et al. |
| 2017/0222260 A1 | 8/2017 | Hatanai et al. |

FOREIGN PATENT DOCUMENTS

| | | | |
|---|---|---|---|
| JP | 2012-036049 A | | 2/2012 |
| JP | 2012036049 A | * | 2/2012 |
| JP | 2013-507317 A | | 3/2013 |
| JP | 2013-077377 A | | 4/2013 |
| JP | 2017-216062 A | | 12/2017 |
| JP | 6903387 B2 | | 7/2021 |
| WO | 2016/063607 A1 | | 4/2016 |

OTHER PUBLICATIONS

International Search Report dated Apr. 14, 2020, issued in counterpart International Application No. PCT/JP2020/002782 (2 pages).
Office Action dated Feb. 25, 2021, issued in Japanese Patent Application No. JP2019-123388 with English translation.
English machine translation of Decision to Grant a Patent dated Jun. 8, 2021, issued in Japanese Patent Application No. 2019-123388.

* cited by examiner

[Figure 1]
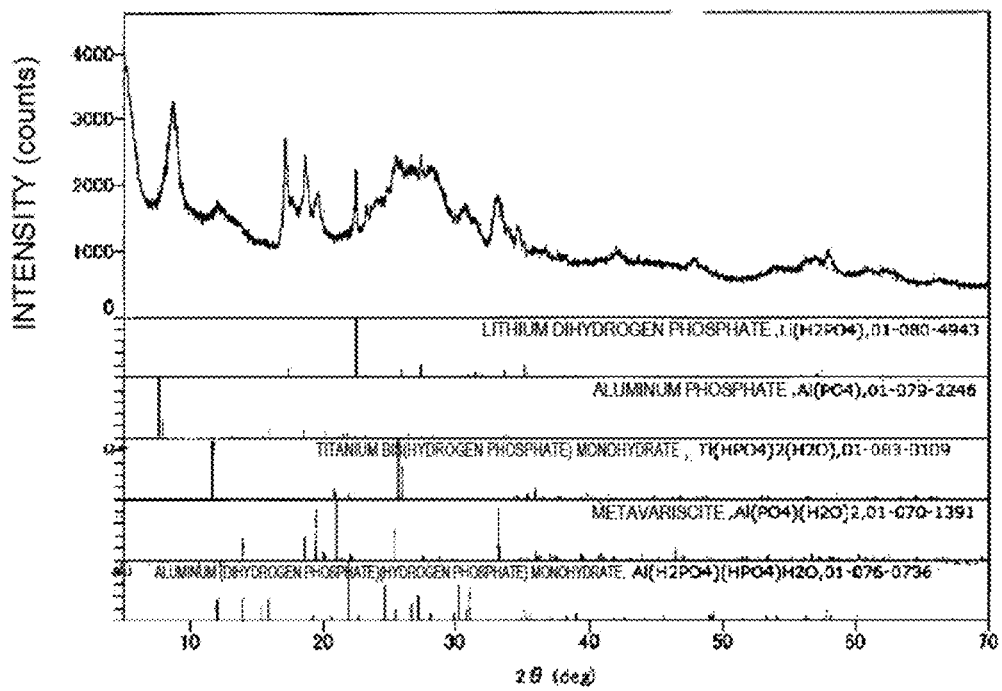
[Figure 2]
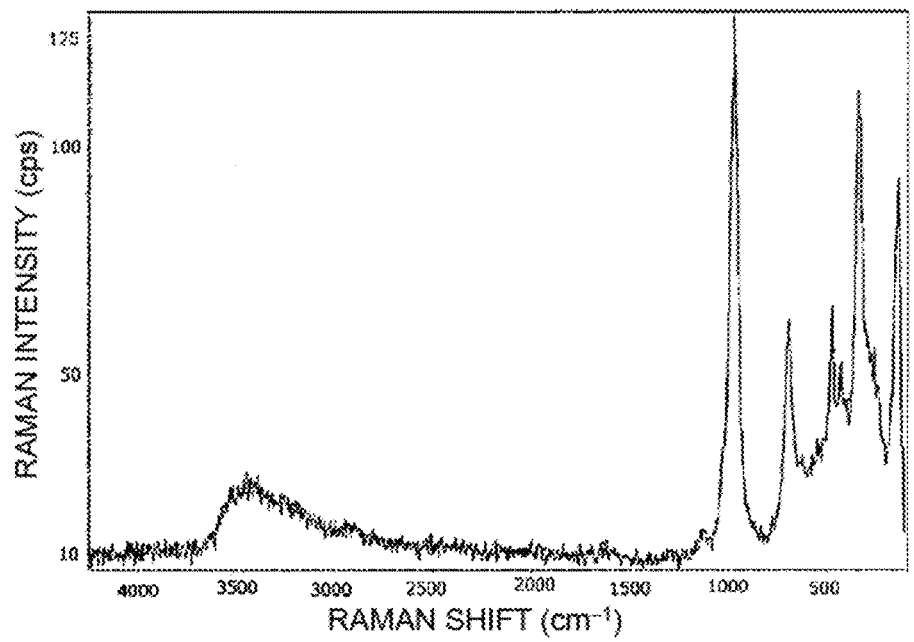

[Figure 3]
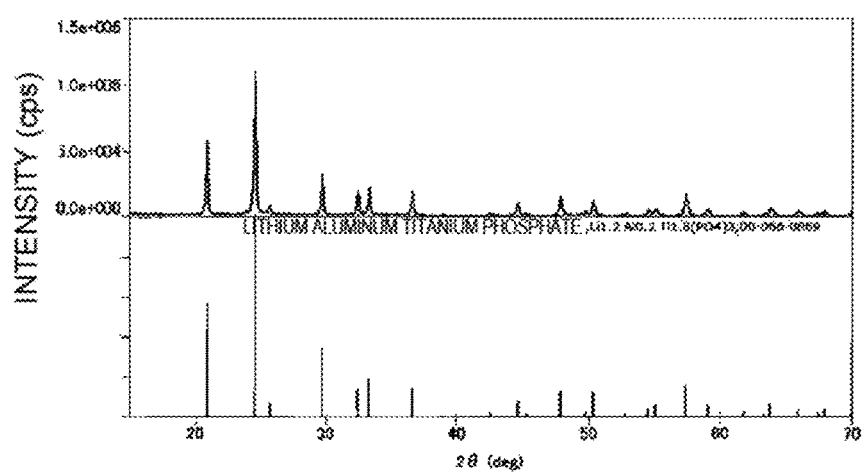
[Figure 4]
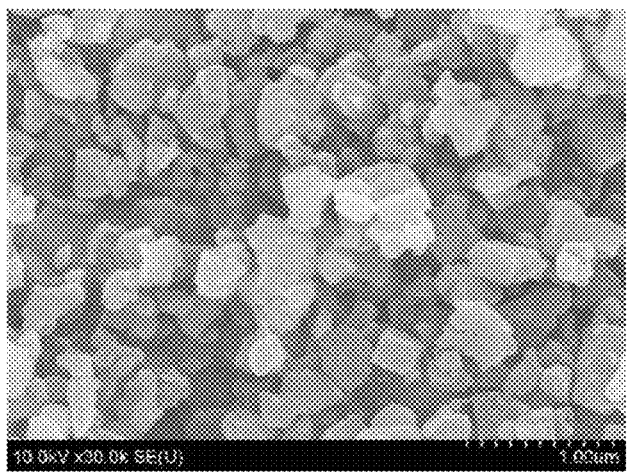

[Figure 5]
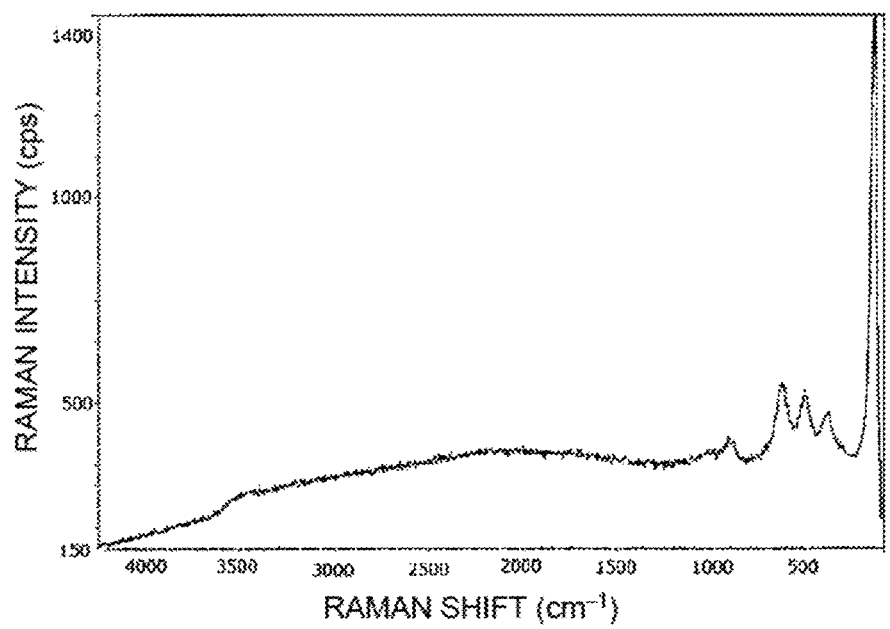
[Figure 6]
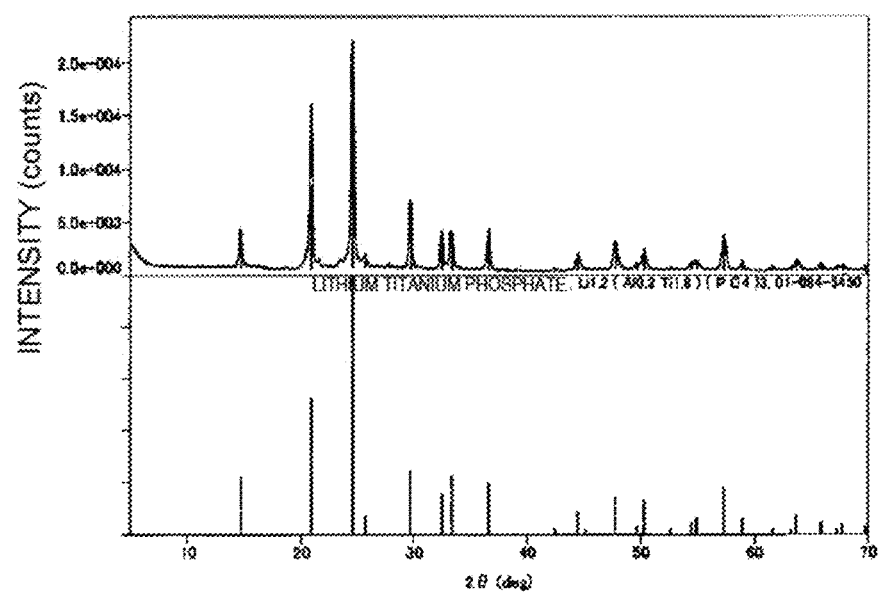

[Figure 7]
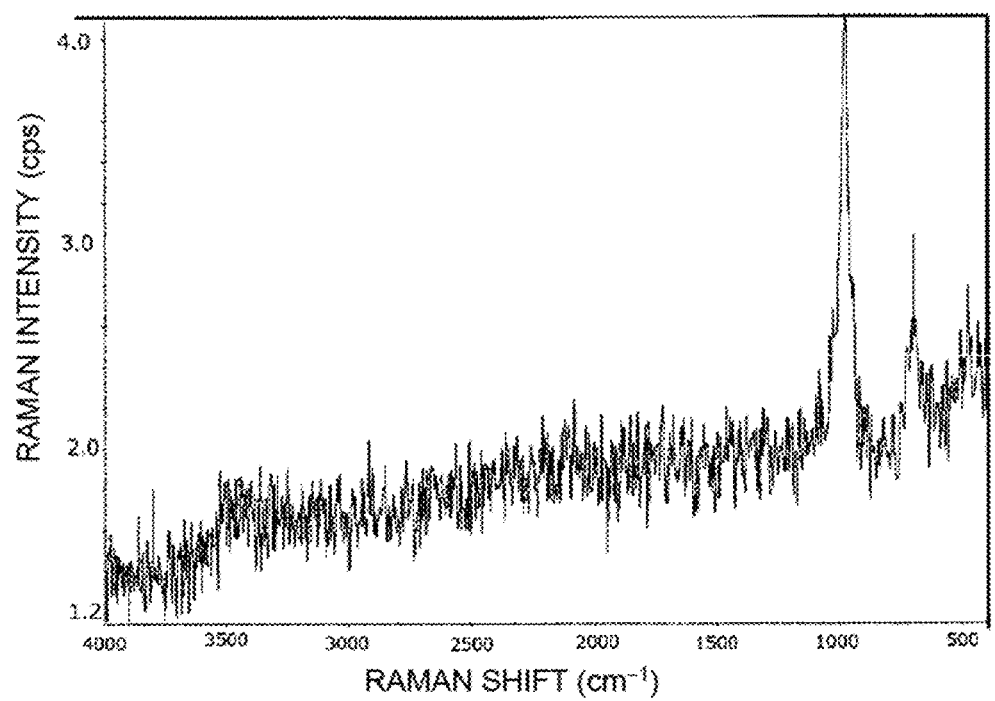

METHOD FOR PRODUCING LITHIUM TITANIUM PHOSPHATE

TECHNICAL FIELD

The present invention relates to a method for producing a lithium titanium phosphate, which is useful as a solid electrolyte.

BACKGROUND ART

As one method of enhancing safety of a lithium secondary battery, there is studied a method of using an oxide-based solid electrolyte having a broad operating temperature range and being stable in the air.

As the oxide-based solid electrolyte, for example, a garnet-type oxide, a NASICON-type oxide and a perovskite-type oxide are studied.

A lithium titanium phosphate having a NASICON structure is stable in the air; and in particular, a lithium titanium phosphate (LATP) in which a part of titanium of lithium titanium phosphate is replaced by an Al element, since being high in the lithium ionic conduction, is one of the materials attracting attention as a solid electrolyte (for example, see Patent Literatures 1 to 4).

As methods for producing a lithium titanium phosphate (LATP), there are proposed, for example, a method in which $TiO_2$, a lithium salt, a phosphate salt and aluminum oxide are dry nixed, and thereafter subjected to a solid-phase reaction by heating (see Patent Literature 1), a method in which a plurality of oxides being raw materials of a lithium titanium phosphate (LATP) are melted with ca $(PO_4)_2$ and vitrified, and the glass is subjected to a heat treatment and an acid treatment (see Patent Literature 3), and a method which a plurality of oxides being raw materials of a lithium titanium phosphate (LATP) are mixed and heated and melted at a temperature equal to or higher than the melting point of the each raw material, and then naturally cooled to produce a NASICON structure-type crystal body, and the crystal body is crushed and then fired (see Patent Literature 4).

CITATION LIST

Patent Literature

Patent Literature 1: Japanese Patent Laid-Open No. 2017-216062
Patent Literature 2: Japanese Patent Laid-Open No. 02-162605
Patent Literature 3: Japanese Patent Laid-Open No. 05-139761
Patent Literature 4: International Publication No. WO 2016/063607

SUMMARY OF INVENTION

Technical Problem

The above solid-phase method, however, has difficulty in industrially advantageously obtaining the raw material mixture in which a titanium source and a phosphorus source are homogeneously mixed, and hence has a problem that it is difficult to industrially advantageously obtain a lithium titanium phosphate having an X-ray diffractometrically single phase; and the method using vitrification becomes complicated in processes and is not industrially advantageous.

Therefore, an object of the present invention is to provide a method capable of providing an X-ray diffractometrically single-phase lithium titanium phosphate through an industrially advantageous process.

Solution to Problem

As a result of exhaustive studies in consideration of the above situation, the present inventors have found that: by heat treating a mixed slurry (1) containing titanium dioxide, phosphoric acid and a surfactant, due to the synergetic effect of an effect by the heat treatment and an effect of the surfactant added, the mixed slurry turns to a lithium-containing heat-treated slurry (3) suppressed in deposition inside a spray dryer even after addition of a lithium source; and a reaction precursor, containing Ti, P, Li and further an M element, obtained by spray drying the lithium-containing heat-treated slurry (3) is excellent in reactivity, and by firing the reaction precursor, an x-ray diffractometrically single-phase lithium titanium phosphate is easily obtained, and this finding has led to the completion of the present invention.

That is, the present invention (1) provides a method for producing a lithium titanium phosphate having a HASICON structure represented by the following general formula (1):

$$Li_{1+x}M_x(Ti_{1-y}A_y)_{2-x}(PO_4)_3 \quad (1)$$

wherein $0 \leq x \leq 1.0$ and $0 \leq y \leq 0.5$; M denotes one or two or more divalent or trivalent metal elements selected from Al, Ga, Sc, Y, La, Fe, Cr, Ni, Mn, In and Co; and A denotes one or two or more tetravalent or pentavalent metal elements selected from Ge, Zr, V, Nb, Sn and Si, the method comprising:

a first step of preparing a raw material mixed
slurry (1) comprising, at least, titanium dioxide, phosphoric acid, a surfactant and a solvent; a second step of heat treating the raw material
mixed slurry (1) to obtain a raw material heat-treated slurry (2);
a third step of mixing the raw material heat-treated slurry (2) with a lithium source to obtain a lithium-containing raw material heat-treated slurry (3);
a fourth step of subjecting the lithium-containing raw material heat-treated slurry (3) to a spray drying treatment to obtain a reaction precursor comprising, at least, Ti, P and Li; and
a fifth step of firing the reaction precursor.

The present invention (2) provides the method for producing a lithium titanium phosphate according to (1), wherein in the first step, an M source (M denotes one or two or more divalent or trivalent metal elements selected from Al, Ga, Sc, Y, La, Fe, Cr, Ni, Mn, In and Co) and/or an A source (A denotes one or two or more tetravalent or pentavalent metal elements selected from Ge, Zr, V, Nb, Sn and Si) is further contained in the raw material mixed slurry (1).

The present invention (3) provides the method for producing a lithium titanium phosphate according to (1), wherein the heat-treated slurry (2) or the lithium-containing heat-treated slurry (3) is further mixed with an M source (M denotes one or two or more divalent or trivalent metal elements selected from Al, Ga, Sc, Y, La, Fe, Cr, Ni, Mn, In and Co) and/or an A source (A denotes one or two or more tetravalent or pentavalent metal elements selected from Ge, Zr, V, Nb, Sn and Si).

The present invention (4) provides the method for producing a lithium titanium phosphate according to any one of (1) to (3), wherein the titanium dioxide is an anatase type.

The present invention (5) provides the method for producing a lithium titanium phosphate according to any one of (1) to (4), wherein the surfactant is an anionic surfactant.

The present invention (6) provides the method for producing a lithium titanium phosphate according to (5), wherein the anionic surfactant is a polycarboxylic acid surfactant.

The present invention (7) provides the method for producing a lithium titanium phosphate according to any one of (1) to (6), wherein the temperature of the hear treatment in the second step is 50 to 120° C.

The present invention (8) provides the method for producing a lithium titanium phosphate according to any one of (1) to (7), wherein the reaction precursor has a peak observed at around 975 cm$^{-1}$ in Raman spectrometry.

The present invention (9) provides the method for producing a lithium titanium phosphate according to any one of (1) to (8), wherein the M source is an Al-containing compound.

The present invention (10) provides the method for producing a lithium titanium phosphate according to (9), wherein the Al-containing compound is aluminum biphosphate.

The present invention (11) provides the method for producing a lithium titanium phosphate according to any one of (1) to (8), wherein the M source is a Cr-containing compound.

The present invention (12) provides the method for producing a lithium titanium phosphate according to (11), wherein the Cr-containing compound is chromium phosphate.

Advantageous Effect of Invention

According to the present invention, there can be provided a method capable of providing an x-ray diffractometrically single-phase lithium titanium phosphate through an industrially advantageous process.

BRIEF DESCRIPTION OF DRAWINGS

FIG. 1 is a diagram of X-ray diffraction of a reaction precursor obtained in the fourth step of Example 1.

FIG. 2 is a Raman spectrum of the reaction precursor obtained in the fourth step of Example 1.

FIG. 3 is a diagram of X-ray diffraction of lithium titanium phosphate obtained in Example 1.

FIG. 4 is a SEM photograph of the lithium titanium phosphate obtained in Example 1.

FIG. 5 is a Raman spectrum of a deposit obtained in Comparative Example 1.

FIG. 6 is a diagram of X-ray diffraction of lithium titanium phosphate obtained in Example 2.

FIG. 7 is a Raman spectrum of a reaction precursor obtained in the fourth step in Example 3.

DESCRIPTION OF EMBODIMENTS

The method for producing a lithium titanium phosphate according to the present invention is a method for producing a lithium titanium phosphate having a NASICON structure represented by the following general formula (1):

wherein 0≤x≤1.0 and 0≤y≤0.5; M denotes one or two or more divalent or trivalent metal elements selected from Al, Ga, Sc, Y, La, Fe, Cr, Ni, Mn, In and Co; and A denotes one or two or more tetravalent or pentavalent metal elements selected from Ge, Zr, V, Nb, Sn and Si, the method comprising:

a first step of preparing a raw material mixed slurry (1) comprising, at least, titanium dioxide, phosphoric acid, a surfactant and a solvent;

a second step of heat treating the raw material mixed slurry (1) to obtain a raw material heat-treated slurry (2);

a third step of mixing the raw material heat-treated slurry (2) with a lithium source to obtain a lithium-containing raw material heat-treated slurry (3);

a fourth step of subjecting the lithium-containing raw material heat-treated slurry (3) to a spray drying treatment to obtain a reaction precursor comprising, at least, Ti, P and Li; and a fifth step of firing the reaction precursor.

The lithium titanium phosphate obtained by the method for producing a lithium titanium phosphate according to the present invention is a lithium titanium phosphate having a NASICON structure represented by the following general formula (1):

wherein 0≤x≤1.0 and 0≤y≤0.5; M denotes one or two or more divalent or trivalent metal elements selected from Al, Ga, Sc, Y, La, Fe, Cr, Ni, Mn, In and Co; and A denotes one or two or more tetravalent or pentavalent metal elements selected from Ge, Zr, V, Mb, Sn and Si.

x in the general formula (1) is 0≤x≤1.0, preferably 0≤x≤0.7. y is 0≤y≤0.5, preferably 0≤y≤0.4. M and/or A is a metal element(s) that are contained according to needs with an aim of improving the performance including lithium ion conductivity. M is a divalent or trivalent metal element(s), and indicates one or two or more metal elements selected from Al, Ga, Sc, Y, La, Fe, Cr, Ni, Mn, In and Co, and is preferably Al and/or Cr.

A is a tetravalent or pentavalent metal element(s), and indicates one or two or more metal elements selected from Ge, Zr, V, Nb, Sn and Si, and is preferably Zr.

Further, x+y in the general formula (1) is 0≤x+y≤1.5, preferably 0≤x+y≤1.0, which is preferable from the viewpoint of improving the performance including lithium ion conductivity.

The first step relevant to the method for producing a lithium titanium phosphate according to the present invention is a step of adding titanium dioxide, phosphoric acid and a surfactant to a solvent and stirring the mixture to mix titanium dioxide, phosphoric acid and the surfactant in the solvent to thereby prepare the raw material mixed slurry (1) comprising titanium dioxide, phosphoric acid and a surfactant.

The titanium dioxide relevant to the first step may be one produced by a sulfuric acid process, may also be one produced by a hydrochloric acid process, may also be one produced by a gas-phase process, or may also be one produced by another known process, and the production method of the titanium dioxide is not especially limited.

The average particle diameter of the titanium dioxide is preferably 20 μm or smaller and especially preferably 0.1 to 10 μm. Due to that the average particle diameter of the titanium dioxide is in the above range, the reactivity with the respective raw materials becomes raised. Further, the BET specific surface area of the titanium dioxide is preferably 50 m$^2$/g or larger and especially preferably 150 to 400 m$^2$/g. Due to that the BET specific surface area of the titanium dioxide is in the above range, the reactivity with the respective raw materials becomes raised.

The crystal structure of titanium dioxide is roughly classified into an anatase type and a rutile type, but in the present invention, titanium dioxide having either crystal structure can be used. The crystal structure of titanium dioxide being an anatase type among these is preferable in that the reactivity becomes good.

The phosphoric acid relevant to the first step is not especially limited as long as being industrially available. The phosphoric acid may also be an aqueous solution.

The surfactant relevant to the first step has a function of being selectively adsorbed on the particle surface of titanium dioxide particles and highly dispersing the titanium dioxide in the raw material mixed slurry (1), and in the heat treatment in the second step, can produce titanium phosphate represented by the general formula (2) described later in the state of the titanium dioxide being highly dispersed. Then, in the method for producing a lithium titanium phosphate according to the present invention, due to the synergetic effect of the heat treatment in the second step and the surfactant remaining in the raw material heat-treated slurry (2) and the lithium-containing heat-treated slurry (3), the viscosity of the lithium-containing raw material heat-treated slurry (3) becomes low. Hence, in the spray drying treatment in the fourth step, deposition of the slurry inside a spray dryer decreases remarkably.

The surfactant relevant to the first step may be any of an anionic surfactant, a cationic surfactant, a nonionic surfactant and an amphoteric surfactant; and an anionic surfactant is preferable in that the effect of suppressing deposition of the slurry inside a spray dryer becomes high.

The anionic surfactant being at least one anionic surfactant selected from carboxylate salts, sulfate ester salts, sulfonate salts and phosphate ester salts is preferable in that there becomes high the effect of making low the viscosity of the raw material heat-treated slurry (2) and the lithium-containing raw material heat-treated slurry (3), and the reaction precursor excellent in reactivity can be obtained; and a polycarboxylic acid surfactant or a polyacrylic acid surfactant is especially preferable, and a polycarboxylic acid surfactant is more preferable. As the polycarboxylic acid surfactant, an ammonium salt of polycarboxylic acid is preferable.

The surfactant may be a commercially available one. Examples of commercially available polycarboxylic acid-type surfactants include SN-Dispersant 5020, SN-Dispersant 5023, SN-Dispersant 5027, SN-Dispersant 5468 and Nopcosperse 5600, manufactured by San Nopco Ltd., and Poiz 532A, manufactured by Kao Corp.

The solvent relevant to the first step is an aqueous solvent, or a mixed solvent of water and a hydrophilic organic solvent. The hydrophilic organic-solvent is not especially limited as long as being inert to the raw materials, and examples thereof include alcohols such as ethanol, propanol and butanol, and methyl ethyl ketone. In the case of a mixed solvent of water and the hydrophilic organic solvent, the mixing ratio of the water and the hydrophilic organic solvent is suitably selected.

The content of titanium dioxide in the raw material mixed slurry (1) is a content corresponding to the molar ratio (P/Ti) of P atoms in phosphoric acid to Ti atoms in the titanium dioxide of preferably 1.50 to 3.00, especially preferably 1.60 to 2.30. Due to that the content of titanium dioxide in the raw material mixed slurry (1) is in the above range, the single-phase lithium titanium phosphate can be more easily obtained.

The content as a solid content of titanium dioxide in the raw material mixed slurry (1) is, with respect to the total amount of the raw material mixed slurry (1), preferably 0.3 to 40% by mass, especially preferably 0.3 to 35% by mass and more preferably 5 to 25% by mass. Due to that the content as a solid content of titanium dioxide in the raw material mixed slurry (1) is in the above range, the dispersibility of each raw material component becomes high and effect of suppressing rising of the viscosity of the slurry becomes high.

The content of the surfactant in the raw material mixed slurry (1) is, with respect to 100 parts by mass of the titanium dioxide, preferably 1 to 20 parts by mass and especially preferably 5 to 15 parts by mass. Due to that the content of the surfactant in the raw material mixed slurry (1) is in the above range, there becomes high the effect of suppressing rising of the viscosity of the slurry.

In the first step, the order of addition of titanium dioxide, phosphoric acid and the surfactant to the solvent is not especially limited.

In the first step, it is preferable that the preparation of the raw material mixed slurry (1) is carried out at a temperature at which the titanium dioxide and the phosphoric acid do not react. The temperature when the raw material mixed slurry (1) is prepared is preferably lower than 50° C., especially preferably 40° C. or lower and more preferably 10 to 30° C.

The second step relevant to the method for producing a lithium titanium phosphate according to the present invention is a step of heat treating the raw material mixed slurry (1) obtained by carrying out the first step to thereby obtain the raw material heat-treated slurry (2).

In the heat treatment in the second step, at least, phosphoric acid and titanium dioxide, and an A source to be added according to needs react to thereby produce a titanium phosphate represented by the following general formula (2):

$$(Ti_{1-y}A_y)(HPO_4)_2 \cdot nH_2O \qquad (2)$$

wherein 0≤y≤0.5; A denotes one or two or more tetravalent or pentavalent metal elements selected from Ge, Zr, V, Nb, Sn and Si; and n denotes 0≤n≤1. Then, in the second step, by heat treating the raw material mixed slurry (1), there is obtained the raw material heat-treated slurry (2) containing the titanium phosphate represented by the above general formula (2).

Since a slurry containing titanium dioxide and phosphoric acid and a slurry obtained by heat treating a slurry containing titanium dioxide and phosphoric acid themselves have remarkably high viscosity, when the slurry is introduced in a spray dryer, deposition of the slurry occurs inside the spray dryer, making spray drying unable to be carried out. By contrast, the present inventors have found that: by heat treating a raw material mixed slurry (1) containing titanium dioxide and phosphoric acid in the presence of a surfactant, a slurry containing at least a titanium phosphate represented by the general formula (2) is obtained; due to the synergetic effect of an effect by the heat treatment and an effect of the surfactant added, slurries (a raw material heat-treated slurry (2) and a lithium-containing raw material heat-treated slurry (3)) are obtained which have low viscosities as compared with the raw material mixed slurry (1) and hardly deposit inside a spray dryer; and a lithium source is added to the raw material heat-treated slurry (2) to obtain the lithium-containing raw material heat-treated slurry (3), which is then spray pyrolyzed to obtain a reaction precursor, which becomes a reaction precursor excellent in reactivity.

The temperature of the heat treatment in the second step is preferably 50 to 120° C. and especially preferably 70 to 105° C. Due to that the temperature of the heat treatment in the second step is in the above range, the reaction of titanium dioxide with phosphoric acid can be completed by an industrially advantageous process. The time of the heat treatment in the second step is not critical in the method for producing a lithium titanium phosphate according to the present invention, and is preferably 2 hours or longer and especially preferably 4 to 24 hours. Due to that the time of the heat treatment in the second step is in the above range, since the titanium phosphate represented by the general formula (2) is produced, and as described later, the reaction is sufficiently carried out until in Raman spectrometry, a peak is observed at around 975 cm$^{-1}$, deposition of the slurry to a spray dryer is suppressed and it becomes easy for the reaction precursor excellent in reactivity to be obtained. Here, in the present invention, a peak being observed at around 975 cm$^{-1}$ in Raman spectrometry refers to that the maximum value of the peak detected is present at around 975 cm$^{-1}$, and "at around 975 cm$^{-1}$" indicates the range of 975±20 cm$^{-1}$.

In the second step, the heat treatment being carried out under stirring is preferable in that the reaction of titanium dioxide with phosphoric acid can efficiently be carried out. Further, in the second step, the heat treatment is carried out preferably under the atmospheric pressure.

The third step relevant to the method for producing a lithium titanium phosphate according to the present invention is a step of mixing the raw material heat-treated slurry (2) with a lithium source to thereby obtain the lithium-containing raw material heat-treated slurry (3).

Examples of the lithium sources relevant to the third step include lithium hydroxide, lithium carbonate, lithium oxide and organic acid lithium salts; and among these, lithium hydroxide is preferable from the viewpoint of being able to be present in the state of being dissolved in the slurry and ease of industrial availability.

With regard to the time of addition of the lithium source to the heat-treated slurry (2), the lithium source may be added to the raw material heat-treated slurry (2) in the heated state after the second step, or the lithium source may be added to the raw material heat-treated slurry (2) cooled nearly to room temperature, preferably to 30° C. or lower, after the second step. Addition of the lithium source to the raw material heat-treated slurry (2) cooled nearly to room temperature, preferably to 30° C. or lower, after the second step is preferable in that the rise of the viscosity of the slurry can be suppressed.

The amount of the lithium source to be added is an amount corresponding to the molar ratio (Li/Ti) of Li atoms in the lithium source to Ti atoms in the raw material heat-treated slurry (2) of preferably 0.5 to 2.0, especially preferably 0.6 to 1.3. Due to that the amount of the lithium source to be added is in the above range, the lithium ion conductivity becomes raised.

The lithium-containing raw material heat-treated slurry (3) is thus obtained in the third step, but in the method for producing a lithium titanium phosphate according to the present invention, as required, at any time from the start of the first step until the end of the third step, an M source (M denotes one or two or more divalent or trivalent metal elements selected from Al, Ga, Sc, Y, La, Fe, Cr, Ni, Mn, In and Co) and/or an A source (A denotes one or two or more tetravalent or pentavalent metal elements selected from Ge, Zr, V, Nb, Sn and Si) can be contained in the slurry (the raw material mixed slurry (1), the raw material heat-treated slurry (2) or the lithium-containing raw material heat-treated slurry (3)). That is, in the method for producing a lithium titanium phosphate according to the present invention, as required, when the raw material mixed slurry (1) is prepared in the first step, the M source and/or the A source can be mixed in the solvent; or the M source and/or the A source can be mixed in the raw material heat-treated slurry (2) obtained in the second step; or when the lithium source is mixed in the third step, the M source and/or the A source can be mixed in the slurry.

Examples of the M sources include oxides, hydroxides, carbonate salts, organic acid salts, nitrate salts and phosphate salts containing an M element. Examples of the M sources include Al-containing compounds and Cr-containing compounds. Examples of the Al-containing compounds include aluminum biphosphate. The Cr-containing compounds include chromium phosphate.

Further, examples of the A sources include oxides, hydroxides, carbonate salts, organic acid salts, nitrate salts and phosphate salts containing an A element.

The content of the M source is a content corresponding to the molar ratio (M/(M+Ti)) of M atoms in the M source to the total molar ratio of Ti atoms in titanium dioxide and M atoms in the M source of higher than 0 and 0.50 or lower, preferably 0.10 to 0.35 and especially preferably 0.15 to 0.30. Due to that the molar ratio (M/(M+Ti)) of M atoms in the M source to the total molar ratio of Ti atoms in titanium dioxide and M atoms in the M source is in the above range, it becomes easy for the X-ray diffractometrically single-phase lithium titanium phosphate to be obtained. In the case of adding the M source, the amount of the lithium source to be added in the third step is an amount corresponding to the molar ratio (Li/(Ti+M)) of Li atoms in the lithium source to the total mol ratio of Ti atoms in the heat-treated slurry (2) and M atoms in the M source of preferably 0.50 to 1.00 and especially preferably 0.60 to 0.90, in that the lithium ion conductivity becomes high.

The content of the A source is a content corresponding to the molar ratio (A/(A+Ti)) of A atoms in the A source to the total molar ratio of Ti atoms in the titanium dioxide and A atoms in the A source of higher than 0 and 0.50 or lower, preferably higher than 0 and 0.40 or lower and especially preferably 0.02 to 0.25. Due to that the molar ratio (A/(A+Ti)) of A atoms in the A source to the total molar ratio of Ti atoms in the titanium dioxide and A atoms in the A source is in the above range, it becomes easy for the X-ray diffractometrically single-phase lithium titanium phosphate to be obtained. In the case of adding the A source, the amount of the lithium source to be added in the third step is an amount corresponding to the molar ratio (Li(Ti+A)) of Li atoms in the lithium source to the total molar ratio of Ti atoms in the heat-treated slurry (2) and A atoms in the A source of preferably 0.50 to 1.00 and especially preferably 0.60 to 0.90, in that the lithium ion conductivity becomes high.

The contents of the K source and the A source in the case of concurrently using the M source and the A source are contents corresponding to the molar ratio ((M+A)/(M+A+Ti)) of the total molar ratio of M atoms in the M source and A atoms in the A source to the total molar ratio of Ti atoms in the titanium dioxide, M atoms in the M source and A atoms in the A source of higher than 0 and 0.5 or lower, preferably 0.1 to 0.35 and especially preferably 0.15 to 0.30. Due to that the molar ratio ((M+A)/(M+A+Ti)) of the total molar ratio of M atoms in the M source and A atoms in the A source to the total mols of Ti atoms in the titanium dioxide, M atoms in the M source and A atoms in the A source is in the above range, it becomes easy for the X-ray diffractometrically single-phase lithium titanium phosphate to be obtained.

The fourth step relevant to the method for producing a lithium titanium phosphate according to the present invention is a step of spray drying the lithium-containing raw material heat-treated slurry (3) obtained by carrying out the third step to thereby obtain the reaction precursor.

In the fourth step, since by carrying out the drying treatment by spray drying, granules in the state of being densely packed with raw material particles are obtained, it becomes easy for the X-ray diffractometrically single-phase lithium titanium phosphate to be obtained.

In the spray drying in the fourth step, the slurry is atomized by a predetermined means, and by drying fine droplets thereby produced, the reaction precursor is obtained. Examples of atomization of the slurry include a method using a rotating disc and a method using a pressure nozzle. In the fourth step, either method can be used.

In the spray drying in the fourth step, the size of atomized droplets is not especially limited, and is preferably 1 to 40 μm and especially preferably 5 to 30 μm. It is preferable that the amount of the slurry to be fed to a spray dryer is determined in consideration of this viewpoint.

In the fourth step, it is preferable, because the moisture absorption of the powder is prevented and the recovery of the powder becomes easy, that the drying temperature in the spray dryer is so adjusted that the hot air inlet temperature becomes 150 to 300° C., preferably 200 to 250° C., and the hot air outlet temperature becomes 80 to 200° C., preferably 100 to 170° C.

The reaction precursor obtained by carrying out the fourth step contains the titanium phosphate represented by the general formula (2). Further, the reaction precursor being one having a peak observed at around 975 cm$^{-1}$ in Raman spectrometry is preferable in that deposition of the slurry to a spray dryer is suppressed and the reaction precursor becomes one excellent in reactivity. Further, the reaction precursor obtained by adding the lithium source and as required, further the M source is allowed to contain, as compounds other than the titanium phosphate represented by the general formula (2), in the form of the compounds containing a Li element and/or compounds containing an M element, obtained by reaction with the lithium source and/or the M source added in the slurry.

By thus carrying out the fourth step, the reaction precursor to be subjected to firing in the fifth step is obtained.

The fifth step relevant to the method for producing a lithium titanium phosphate according to the present invention is a step of firing the reaction precursor obtained by carrying out the fourth step to thereby obtain the X-ray diffractometrically single-phase lithium titanium phosphate.

The firing temperature in the fifth step is preferably 500 to 1,100° C. and especially preferably 550 to 1,050° C. Due to that the firing temperature is in the above range, the X-ray diffractometrically single-phase lithium titanium phosphate is obtained. By contrast, when the firing temperature is lower than the above range, the firing time until the X-ray diffractometrically single-phase is made becomes too long, and it is likely to be difficult for a sharp particle size distribution to be attained. Further, when the firing temperature exceeds the above range, since sintered bodies in which primary particles have largely grown turn to coarse particles, the case is not preferable.

The firing atmosphere in the fifth step is the air atmosphere or an inert gas atmosphere. Examples of the inert gases include argon gas, helium gas and nitrogen gas, and among these, nitrogen gas is preferable from the viewpoint of being inexpensive and industrially advantageous.

The firing time in the fifth step is not especially limited, and is 0.5 hour or longer and preferably 2 to 20 hours. In the fifth step, when the firing is carried out for 0.5 hour or longer, preferably 2 to 20 hours, the X-ray diffractometrically single-phase lithium titanium phosphate can be obtained.

In the fifth step, a lithium titanium phosphate obtained by once carrying out the firing may be fired multiple times, as required.

The lithium titanium phosphate obtained by carrying out the fifth step may be subjected to disintegrating treatment or crushing treatment, and further to classification, as required.

The lithium titanium phosphate thus obtained by the method for producing a lithium titanium phosphate according to the present invention is an X-ray diffractometrically single-phase lithium titanium phosphate, and additionally has an average particle diameter as determined by a laser diffraction scattering method of preferably 10 μm or smaller and especially preferably 0.1 to 5 μm, and a BET specific surface area of preferably 1 m$^2$/g or larger and especially preferably 5 to 30 m$^2$/g. The average particle diameter as determined by a laser diffraction scattering method refers to the particle diameter at a cumulative percentage of 50% (D50) determined by a volume-frequency particle size distribution measurement measured by the laser diffraction scattering method.

The lithium titanium phosphate obtained by carrying out the method for producing a lithium titanium phosphate according to the present invention is suitably utilized as a solid electrolyte, a positive electrode material or a negative electrode material of a secondary battery.

EXAMPLES

Hereinafter, the present invention will be described by way of Examples, but the present invention is not limited thereto.
<Evaluation Apparatuses>
X-ray diffractometer: Ultima IV, manufactured by Rigaku Corp.
A radiation source used was Cu-Kα. The measurement conditions were set at: a tube voltage of 40 kV, a tube current of 40 mA and a scanning rate of 0.1°/sec.
Raman spectrometer: used was NicoletAlmega XR, manufactured by Thermo Fisher Scientific Inc. The measurement condition was set at a laser wavelength of 532 nm.

Example 1

<First Step>
600 g of an anatase-type titanium dioxide (average particle diameter: 4 μm, BET specific surface area: 323 m$^2$/g, anatase-type content: 99.9% by mass) of 89.9% in purity, 52.2 g of an anionic surfactant (ammonium polycarboxylate, SN-Dispersant 5468, manufactured by San Nopco Ltd.) and 962.9 g of a 85-mass % phosphoric acid (water content: 15% by mass) were added in this order in 4.6 L of pure water at room temperature (25° C.) under stirring using a Three-One Motor stirrer to thereby prepare a raw material mixed slurry (1).
<Second Step>
Then, under stirring, the raw material mixed slurry (1) was heated at 30° C./h up to 90° C., held as it was at 90° C. for 8 hours, and thereafter naturally cooled down to room temperature (25° C.) to thereby obtain a raw material heat-treated slurry (2).

<Third Step>

Then, to the raw material heat-treated slurry (2), 715 g of a 50-mass % aluminum biphosphate aqueous solution and then, a lithium hydroxide aqueous solution in which 216.7 g of lithium hydroxide monohydrate was dissolved in 870 ml of pure water were added over 20 minutes under stirring to thereby obtain a lithium-containing raw material heat-treated slurry (3).

<Fourth Step>

Then, the lithium-containing raw material heat-treated slurry (3) was fed at a feed rate of 2.4 L/h to a spray dryer set at 220° C. to thereby obtain a dried material. The inside of the spray dryer was visually observed and there was a little inside deposition, and the recovery rate was 95% in terms of solid content. The obtained dried material was subjected to X-ray diffractometry, which observed α-Ti (HPO$_4$)$_2$(H$_2$O), and besides, detected also Li(H$_2$PO$_4$), Al(PO$_4$), Al(PO$_4$)(H$_2$O) and Al(H$_2$PO$_4$)(HPO$_4$) (FIG. 1). Raman spectrometry confirmed a peak at 975 cm$^{-1}$ (FIG. 2).

<Fifth Step>

Then, the obtained reaction precursor was fired in the air at 700° C. for 4 hours to thereby obtain a fired material. Then, the fired material was crushed by an air flow crusher to thereby obtain a crushed material.

The obtained crushed material was subjected to X-ray diffractometry, which gave such a result that the fired material was a single-phase Li$_{1.2}$Al$_{0.2}$Ti$_{1.8}$(PO$_4$)$_3$ having a NASICON structure (FIG. 3). This was taken as a lithium titanium phosphate sample. A SEM photograph of the obtained lithium titanium phosphate sample is shown in FIG. 4.

Comparative Example 1

600 g of an anatase-type titanium dioxide (average particle diameter: 4 μm, BET specific surface area: 323 m$^2$/g, anatase-type content: 99.9% by mass) of 89.9% in purity, 52.2 g of an anionic surfactant (ammonium polycarboxylate, SN-Dispersant 5468, manufactured by San Nopco Ltd.) and 962.9 g of a 85-mass % phosphoric acid (water content: 15% by mass) were added in this order in 4.6 L of pure water at room temperature (25° C.) under stirring using a Three-One Motor stirrer for 8 hours to thereby obtain a raw material mixed slurry (1).

Then, to the raw material mixed slurry (1), 715 g of a 50-mass % aluminum biphosphate aqueous solution and then a lithium hydroxide aqueous solution in which 216.7 g of lithium hydroxide monohydrate was dissolved in 870 ml of pure water were added over 20 minutes under stirring to thereby obtain a lithium-containing slurry.

Then, the lithium-containing slurry was fed at a feed rate of 2.4 L/h to a spray dryer set at 220° C., but almost all the amount of the slurry deposited inside the spray dryer. The deposit was subjected to Raman spectrometry, which confirmed no peak at around 575 cm$^{-1}$ (FIG. 5).

Comparative Example 2

600 g of an anatase-type titanium dioxide (average particle diameter: 4 μm, BET specific surface area: 323 m$^2$/g, anatase-type content: 99.9% by mass) of 89.9% in purity and 962.9 g of 85-mass % phosphoric acid (water content: 15% by mass) were added in this order in 4.6 L of pure water at room temperature (25° C.) under stirring using a Three-One Motor stirrer for 8 hours to thereby obtain a mixed slurry (1).

Then, the slurry was heated at 30° C./h up to 90° C. under stirring, when the slurry was gelated and became unable to be stirred. The gelated cake was subjected to Raman spectrometry, which confirmed a peak at around 975 cm$^{-1}$.

TABLE 1

| | First Step | | Molar ratio of P/Ti added | Second Step | | Fifth Step | |
|---|---|---|---|---|---|---|---|
| | Kind of TiO$_2$ | Kind of surfactant | | Heating temperature (° C.) | Time (h) | Firing temperature (° C.) | Time (h) |
| Example 1 | anatase | ammonium polycarboxylate | 1.76 | 90 | 8 | 700 | 4 |
| Comparative Example 1 | anatase | ammonium polycarboxylate | 1.76 | — | — | — | — |
| Comparative Example 2 | anatase | — | 1.76 | 90 | 8 | — | — |

(1) <Evaluation of Physical Properties>

For the lithium titanium phosphate sample obtained in Example, the average particle diameter and the BET specific surface area were measured. The average particle diameter was determined by a laser diffraction scattering method.

(2) <Evaluation of the Lithium Ionic Conduction>

<Fabrication of a Molding 1>

0.5 g of the lithium titanium phosphate sample obtained in Example and 0.05 g of a binder (Spectro Blend(R), 4.4 μm powder) were mixed in a mortar for 5 minutes, wholly filled in a metal mold of φ10 mm, and molded into a pellet shape at a pressure of 300 kg by using a hand press to fabricate a powder green compact. The obtained powder green compact was fired in the air in an electric furnace at 850° C. for 4 hours to thereby obtain a ceramic molding.

<Measurement of the Lithium Ion Conductivity>

Electrodes were formed on both surfaces of the ceramic molding by Pt vapor deposition; thereafter, the alternating-current impedance measurement was carried out thereon, and the lithium ion conductivity at room temperature (25° C.) was determined by fitting to an obtained cole-cole plot.

TABLE 2

| | Average particle diameter (μm) | BET specific surface area (m$^2$/g) | Lithium ion conductivity (S/cm) |
|---|---|---|---|
| Example 1 | 1.1 | 8.32 | $2 \times 10^{-4}$ |

Example 2

<First Step>

540 g of an anatase-type titanium dioxide (average particle diameter: 4 μm, BET specific surface area: 323 m$^2$/g, anatase-type content: 99.9% by mass) of 89.9% in purity, 295.0 g of a zirconium hydroxide of 23.2% in purity in terms of ZrO$_2$, 52.2 g of an anionic surfactant (ammonium polycarboxylate, SN-Dispersant 5468, manufactured by San Nopco Ltd.) and 962.9 g of a 85-mass % phosphoric acid (water content: 15% by mass) were added in this order in 4.6 L of pure water at room temperature (25° C.) under stirring using a Three-One Motor stirrer to thereby prepare a raw material mixed slurry (1).

<Second Step to Fourth Step>

Then, a second step to a fourth step were carried out as in Example 1 to thereby obtain a reaction precursor. The reaction precursor obtained in the fourth step was subjected to Raman spectrometry, which confirmed a peak at 975 cm$^{-1}$. Then, the reaction precursor was subjected to X-ray diffractometry, which detected a titanium phosphate in which Zr was contained in a molar ratio (Zr/Ti) of 0.1 in α-Ti(HPO$_4$)$_2$(H$_2$O), and besides, also Li(H$_2$PO$_4$), Al(PO$_4$), Al(PO$_4$)(H$_2$O) and Al(H$_2$PO$_4$)HPO$_4$).

In the fourth step, when the inside of the spray dryer was visually observed after the spray drying as in Example 1, there was a little inside deposition and the recovery rate was 94%.

(H$_{1.5}$PO$_4$)$_2$, manufactured by Nippon Chemical Industrial Co., Ltd.) and then a lithium hydroxide aqueous solution in which 283.4 g of lithium hydroxide monohydrate was dissolved in 1,140 ml of pure water were added over 20 minutes under stirring to thereby obtain a lithium-containing raw material heat-treated slurry (3).

<Fourth Step>

Then, the lithium-containing raw material heat-treated slurry (3) was fed at a feed rate of 2.4 L/h to a spray dryer set at 220° C. to thereby obtain a dried material. The inside of the spray dryer was visually observed and there was a little inside deposition, and the recovery rate was 96% in terms of solid content. The obtained dried material was subjected to X-ray diffractometry, which detected α-Ti(HPO$_4$)$_2$(H$_2$O) and CrHP$_2$O$_7$. Raman spectrometry confirmed a peak at 975 cm$^{-1}$ (FIG. 7).

<Fifth Step>

Then, the obtained reaction precursor was fired in the air at 1,000° C. for 4 hours to thereby obtain a fired material. Then, the fired material was crushed by an air flow crusher to thereby obtain a crushed material.

The obtained crushed material was subjected to X-ray diffractometry, which gave such a result that the fired material was a single-phase Li$_{1.5}$Cr$_{0.5}$Ti$_{1.5}$(PO$_4$)$_3$ having a NASICON structure. This was taken as a lithium titanium phosphate sample.

TABLE 3

| | | First Step | | | | | Second Step | | Fifth Step | |
|---|---|---|---|---|---|---|---|---|---|---|
| | | | Molar | | | | | | | |
| | Kind of TiO$_2$ | Kind of surfactant | ratio of P/Ti added | Element M added | x | Element A added | y | Heating temperature (° C.) | Time (h) | Firing temperature (° C.) | Time (h) |
| Example 2 | anatase | ammonium polycarboxylate | 1.96 | Al | 0.30 | Zr | 0.17 | 90 | 8 | 700 | 4 |
| Example 3 | anatase | ammonium polycarboxylate | 2.00 | Cr | 0.50 | — | — | 90 | 8 | 1000 | 4 | note)
"x" and "y" in Table denote values of x and y in the general formula (1).

<Fifth Step>

Then, a fifth step was carried out as in Example 1 on the obtained reaction precursor to thereby obtain a fired material.

The obtained fired material was subjected to X-ray diffractometry, which revealed that no hetero-phase was observed and the fired material was a single-phase lithium titanium phosphate in which Zr was contained in a molar ratio (Zr/Ti) of 0.1 in Li$_{1.2}$Al$_{0.2}$Ti$_{1.8}$(PO$_4$)$_3$ having a NASICON structure (FIG. 6). This was taken as a lithium titanium phosphate sample.

Example 3

A raw material heat-treated slurry (2) was obtained by carrying out a first step and a second step using the same method as in Example 1, except for altering the amount of phosphoric acid added to 1,033 g.

<Third Step>

Then, to the raw material heat-treated slurry (2), 1,808 g of a 30.6-mass % chromium phosphate solution 2M (Cr (1) <Evaluation of Physical Properties>

For the lithium titanium phosphate samples obtained in Examples 2 and 3, the average particle diameter and the BET specific surface area were measured as in Example 1.

(2) <Evaluation of the Lithium Ionic Conduction>

<Fabrication 2 of a Molding>

A powder green compact was obtained as in Fabrication 1 of a molding by using the lithium titanium phosphate sample obtained in Example 3. Then, the powder green compact was fired in the air in an electric furnace at 1,100° C. for 4 hours to thereby obtain a ceramic molding.

<Measurement of the Lithium Ion Conductivity>

For the ceramic molding obtained above, the lithium ion conductivity at room temperature (25° C.) was determined as in Example 1.

TABLE 4

|  | Average particle diameter (μm) | BET specific surface area (m²/g) | Lithium ion conductivity (S/cm) |
| --- | --- | --- | --- |
| Example 2 | 1.3 | 18.3 | — |
| Example 3 | 2.5 | 1.76 | $5 \times 10^{-4}$ | note)
"—" in Table denotes being unmeasured

The invention claimed is:

1. A method for producing a lithium titanium phosphate having a NASICON structure represented by the following general formula (1):

$$Li_{1+x}M_x(Ti_{1-y}A_y)_{2-x}(PO_4)_3 \qquad (1)$$

wherein $0 \leq x \leq 1.0$ and $0 \leq y \leq 0.5$; M denotes one or two or more divalent or trivalent metal elements selected from Al, Ga, Sc, Y, La, Fe, Cr, Ni, Mn, In and Co; and A denotes one or two or more tetravalent or pentavalent metal elements selected from Ge, Zr, V, Nb, Sn and Si, the method comprising:
- a first step of preparing a raw material mixed slurry (1) comprising at least titanium dioxide, phosphoric acid, a polycarboxylic acid surfactant and a solvent;
- a second step of heat treating the raw material mixed slurry (1) at 50° C. to 105° C. to obtain a raw material heat-treated slurry (2);
- a third step of mixing the raw material heat-treated slurry (2) with a lithium source to obtain a lithium-containing raw material heat-treated slurry (3);
- a fourth step of subjecting the lithium-containing raw material heat-treated slurry (3) to a spray drying treatment to obtain a reaction precursor comprising at least Ti, P and Li; and
- a fifth step of firing the reaction precursor.

2. The method for producing a lithium titanium phosphate according to claim 1, wherein in the first step (1), an M source (M denotes one or two or more divalent or trivalent metal elements selected from Al, Ga, Sc, Y, La, Fe, Cr, Ni, Mn, In and Co) and/or an A source (A denotes one or two or more tetravalent or pentavalent metal elements selected from Ge, Zr, V, Nb, Sn and Si) are further contained in the raw material mixed slurry (1).

3. The method for producing a lithium titanium phosphate according to claim 1, wherein the heat-treated slurry (2) or the lithium-containing heat-treated slurry (3) is further mixed with an M source (M denotes one or two or more divalent or trivalent metal elements selected from Al, Ga, Sc, Y, La, Fe, Cr, Ni, Mn, In and Co) and/or an A source (A denotes one or two or more tetravalent or pentavalent metal elements selected from Ge, Zr, V, Nb, Sn and Si).

4. The method for producing a lithium titanium phosphate according to claim 1, wherein the titanium dioxide is an anatase type.

5. The method for producing a lithium titanium phosphate according to claim 1, wherein the reaction precursor has a peak observed at around 975 cm$^{-1}$ in Raman spectrometry.

6. The method for producing a lithium titanium phosphate according to claim 1, wherein the M source is an Al-containing compound.

7. The method for producing a lithium titanium phosphate according to claim 6, wherein the Al-containing compound is aluminum biphosphate.

8. The method for producing a lithium titanium phosphate according to claim 1, wherein the M source is a Cr-containing compound.

9. The method for producing a lithium titanium phosphate according to claim 8, wherein the Cr-containing compound is chromium phosphate.

* * * * *